(12) United States Patent  (10) Patent No.: US 10,012,406 B2
Kim  (45) Date of Patent: Jul. 3, 2018

(54) METHOD AND APPARATUS FOR CONTROLLING TEMPERATURE

(71) Applicant: Samsung Electronics Co., Ltd., Gyeonggi-do (KR)

(72) Inventor: Kyung-Jae Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 167 days.

(21) Appl. No.: 14/713,779

(22) Filed: May 15, 2015

(65) Prior Publication Data

US 2015/0330652 A1  Nov. 19, 2015

Related U.S. Application Data

(60) Provisional application No. 61/993,708, filed on May 15, 2014.

(30) Foreign Application Priority Data

Nov. 20, 2014 (KR) ........................ 10-2014-0162281

(51) Int. Cl.
  *F24F 11/00* (2006.01)
  *G05B 15/02* (2006.01)
  *H04W 4/00* (2009.01)

(52) U.S. Cl.
  CPC .......... *F24F 11/006* (2013.01); *F24F 11/001* (2013.01); *F24F 11/0034* (2013.01);
  (Continued)

(58) Field of Classification Search
  CPC .. F24F 11/006; F24F 11/0034; F24F 11/0076; F24F 11/001; F24F 2011/0047;
  (Continued)

(56) References Cited

U.S. PATENT DOCUMENTS 4,911,358 A * 3/1990 Mehta ................ G05D 23/1904
          165/239
5,025,984 A  6/1991 Bird et al.
(Continued)

FOREIGN PATENT DOCUMENTS

JP  05-133583  5/1993
JP  07-158927  6/1995
(Continued)

OTHER PUBLICATIONS

International Search Report dated Aug. 24, 2015 issued in counterpart application No. PCT/KR2015/004925, 14 pages.
(Continued)

*Primary Examiner* — Ramesh Patel
(74) *Attorney, Agent, or Firm* — The Farrell Law Firm, P.C.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method for controlling temperature in a temperature controlling system is provided. The method includes determining occupancy or non-occupancy of a user in a space subject to setback control; when the user's non-occupancy is determined, determining whether to start the setback control based on probability distribution of a non-occupancy period that are predetermined; when it is determined to start the setback control, determining the user's target temperature based on previously collected data; calculating a setback temperature based on the target temperature; and performing
(Continued)

the setback control according to the calculated setback temperature.

24 Claims, 10 Drawing Sheets

(52) U.S. Cl.
CPC .......... *F24F 11/0076* (2013.01); *G05B 15/02* (2013.01); *H04W 4/005* (2013.01); *F24F 2011/0047* (2013.01); *F24F 2011/0063* (2013.01); *F24F 2011/0064* (2013.01); *F24F 2011/0073* (2013.01); *F24F 2011/0075* (2013.01)

(58) Field of Classification Search
CPC ....... F24F 2011/0063; F24F 2011/0064; F24F 2011/0073; F24F 2011/0075; G05B 15/02; H04W 4/005
See application file for complete search history.

(56) References Cited

U.S. PATENT DOCUMENTS

| | | | | |
|---|---|---|---|---|
| 5,270,952 | A * | 12/1993 | Adams | G05D 23/1904 165/239 |
| 5,384,716 | A * | 1/1995 | Araki | F24F 11/0009 374/112 |
| 5,395,042 | A * | 3/1995 | Riley | F24F 11/0009 165/237 |
| 5,555,927 | A | 9/1996 | Shah | |
| 7,802,618 | B2 * | 9/2010 | Simon | F24F 11/0012 165/254 |
| 8,510,255 | B2 * | 8/2013 | Fadell | G05B 15/02 706/52 |
| 9,189,751 | B2 * | 11/2015 | Matsuoka | H04L 12/2829 |
| 2005/0288822 | A1 | 12/2005 | Rayburn | |
| 2008/0083234 | A1 * | 4/2008 | Krebs | F24F 11/0086 62/129 |
| 2008/0083834 | A1 * | 4/2008 | Krebs | B60H 1/00892 237/2 A |
| 2008/0099570 | A1 * | 5/2008 | Krebs | F23N 5/203 236/46 R |
| 2010/0019051 | A1 | 1/2010 | Rosen | |
| 2010/0025483 | A1 * | 2/2010 | Hoeynck | F24F 11/001 236/1 C |
| 2010/0243231 | A1 * | 9/2010 | Rosen | G05D 23/1904 165/237 |
| 2012/0066168 | A1 * | 3/2012 | Fadell | G05B 15/02 706/52 |
| 2012/0072030 | A1 * | 3/2012 | Elliott | F24F 11/0009 700/276 |
| 2012/0261481 | A1 * | 10/2012 | Donlan | H05B 1/0275 237/12 |
| 2013/0173064 | A1 * | 7/2013 | Fadell | G05D 23/1902 700/276 |
| 2013/0204441 | A1 * | 8/2013 | Sloo | F24F 11/0086 700/276 |
| 2013/0331995 | A1 * | 12/2013 | Rosen | G05B 15/02 700/276 |
| 2014/0101082 | A1 * | 4/2014 | Matsuoka | H04L 12/2829 706/12 |

FOREIGN PATENT DOCUMENTS

| | | |
|---|---|---|
| JP | 11-014119 | 1/1999 |
| JP | 2013-044462 | 3/2013 |
| JP | 2013-088105 | 5/2013 |
| WO | WO 2012/068495 | 5/2012 |

OTHER PUBLICATIONS

European Search Report dated Mar. 28, 2018 issued in counterpart application No. 15792968.8-1008, 7 pages.

* cited by examiner

METHOD AND APPARATUS FOR CONTROLLING TEMPERATURE

PRIORITY

This application claims priority under 35 U.S.C. § 119(e) to U.S. Provisional Patent Application Ser. No. 61/993,708, which was filed in the United States Patent and Trademark Office on May 15, 2014, and under 35 U.S.C. § 119(a) to Korean Application Serial No. 10-2014-0162281, which was filed in the Korean Intellectual Property Office on Nov. 20, 2014, the entire contents of which are incorporated herein by reference.

BACKGROUND OF THE INVENTION

1. Field of the Invention

The present invention generally relates to an temperature control method and apparatus of a heating/ventilation/air-conditioning (HVAC) system for efficiently saving energy in a building management system.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a Machine-to-Machine (M2M) communication, Machine Type Communication (MTC), and so forth, have been recently researched.

Such an IoT environment may provide intelligent Internet technology services that create a new value to human's life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In general, buildings, such as hotels or office buildings, have an energy control system for effectively controlling energy. Such an energy control system performs occupancy detection using a door lock, a motion sensor, or the like, and when non-occupancy of a user is detected, it performs setback control based on the detection result. The setback control is a control method of temporarily changing a set temperature of a room in order to save energy during a time period, such as at night, when no user is in the room. The setback control may be initiated immediately when non-occupancy of a user is detected or when non-occupancy of the user is maintained for a predetermined time after being detected. In the former case, if the user goes out for a while and then comes back again, more energy may be consumed than the case in which the user stays in a room. That is because more energy consumption is required than usual for instantaneous temperature control when the user comes back again. In the latter case, energy may be additionally consumed until the setback control is initiated after the detection of the non-occupancy state.

In the case of static setback control using a constant value, when a user comes back, a lot of time is required in returning to a normal temperature such that the user may feel uncomfortable for the corresponding period of time. Therefore, even when the user stays out for a long time, it is not appropriate to turn the power off for energy saving. Further, in view of the characteristics of devices, the temperature which each device can change within a predetermined time may be extracted, and dynamic setback control may be performed based on the extracted temperature. However, such a method does not consider the time of the occupancy of a user. Therefore, energy efficiency is not good, and the user may not be serviced comfortably at the time of his/her occupancy using the static setback control. Furthermore, a method of detecting occupancy using a motion sensor or a door lock is also ineffective in handling various situations, such as a blind spot of the motion sensor, or when several users are in the area.

Moreover, in the case of hotels, demands of the user and energy saving differ from each other according to types of the hotels. Accordingly, a method for satisfying the above conditions in an HVAC system is required.

SUMMARY OF THE INVENTION

The present invention has been made to solve at least the above-mentioned problems and/or disadvantages and to provide at least the advantages described below.

Accordingly, an aspect of the present invention is to provide a method and apparatus that can increase accuracy of occupancy detection using devices and sensors in a space that are connected to a network and can perform temperature control using the same.

Another aspect of the present invention is to provide a method and apparatus that can analyze a non-occupancy pattern according to a characteristic of a user and perform temperature control based on the pattern.

Another aspect of the present invention is to provide a method and apparatus that can extract a room temperature desired by a user and perform temperature control based on the extracted temperature.

In accordance with an aspect of the present invention, a method for controlling temperature in a heating/ventilation/air-conditioning (HVAC) system is provided. The method includes determining occupancy or non-occupancy of a user in a space subject to temperature control; when the user's non-occupancy is determined, determining whether to start the temperature control based on probability distribution of a non-occupancy period that are predetermined; when it is determined to start the temperature control, determining the user's target temperature based on previously collected data; calculating a setback temperature based on the target temperature; and performing temperature control according to the calculated setback temperature.

In accordance with another aspect of the present invention, an apparatus for controlling temperature in a heating/ventilation/air-conditioning (HVAC) system is provided. The apparatus includes a storage unit configured to store user related information and space related information; a temperature detection unit configured to determine occupancy or non-occupancy of a user in a space subject to setback control and to detect an inner temperature of the space; and a temperature controller configured to determine whether to start the setback control based on probability distribution of a non-occupancy period when the user's non-occupancy is determined, to determine the user's target temperature based on previously collected data when it is determined to start the setback control, and to perform the setback control according to a setback temperature that are determined based on the target temperature.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1A:
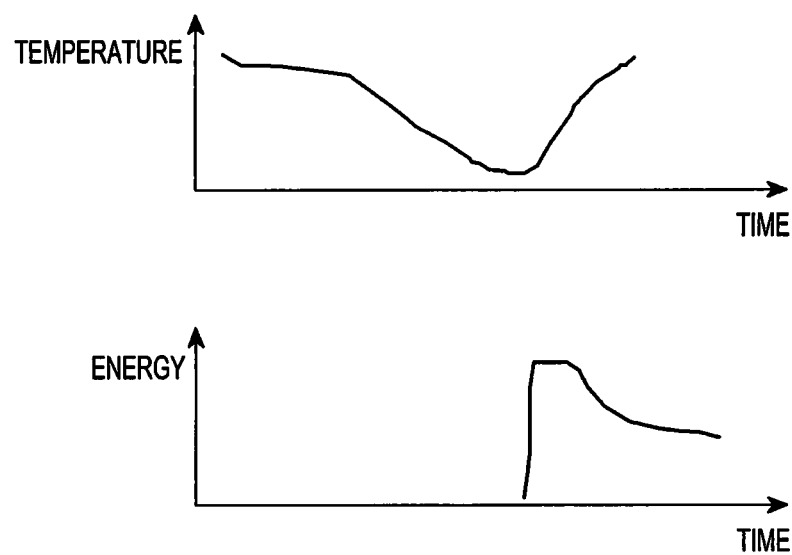
FIGS. 1A and 1B illustrate a change in temperature and energy consumption according to an on/off operation of a heater.

Hereinafter, certain embodiments of the present invention will be described in detail with reference to the accompanying drawings. It is noted that, when possible, the same reference numerals are designated to the same components in the accompanying drawings. Further, a detailed description of a known function and configuration which may make the subject matter of the present invention unclear will be omitted.

For effective and efficient control of heating/ventilation/air conditioning in the absence of a user in a particular space, the present disclosure provides a method of determining occupancy or non-occupancy of the user using the states of a plurality of devices and sensors that are controlled/monitored while being connected to a gateway (GW) or a device functioning as a GW (e.g., a mobile phone, a television (TV), an air-conditioner, a set-top box (STB), a refrigerator, a robot cleaner, a tablet personal computer (PC), a PC, etc.), and a comfort guaranteed energy saving method that is based on the user's occupancy/non-occupancy pattern.

For energy control, according to an embodiment of the present invention, a time of non-occupancy, a time of occupancy, and a period of non-occupancy of the user are stored in a server or a gateway for a predetermined period of time. In addition, a date, a day of the week, a time period, temperature/humidity, an amount of sunshine, supplied energy, spatial temperature, and a control history of a heating/ventilation/air conditioning system are stored in the server or the gateway. Furthermore, data about the number and gender of users, the temperature of rooms, and a heating/ventilation/air conditioning control status may be collected from a system for managing a construction subject to energy control, such as a building or a hotel, and may be reflected in the energy control. Moreover, data about information on surroundings of the construction may also be collected and reflected in the energy control.

An energy control method according to an embodiment of the present invention may be separated into a method of determining occupancy or non-occupancy, a method of automatically extracting a comfort temperature at which a user feels comfortable, a method of correcting the comfort temperature in response to a user's feedback, a method of collecting and processing data for analysis of a user's occupancy/non-occupancy pattern, and a method of receiving, from a system manager, an energy saving rate and a desired time for returning to a comfort temperature and controlling a setback temperature, a pre-heating start time, and a pre-cooling start time. Hereinafter, these methods will be described in detail. Furthermore, "energy control" will be hereinafter used interchangeably with "setback control".

First, a method of determining occupancy or non-occupancy for setback control, according to an embodiment of the present invention, will be described.

In an embodiment of the present invention, in order to more accurately determine occupancy or non-occupancy, devices or sensors in a space may be connectable to a network or gateway, and the occupancy or non-occupancy may be determined by reflecting the states of the devices or sensors (e.g., states in which the devices are turned on/off or states in which the devices are connected to a network such as a Wireless Local Area Network (WLAN)). Utilizing such information, reliability of the detection result on occupancy or non-occupancy may be enhanced in comparison with using only typical door locks or motion sensors.

In an embodiment of the present invention, a space is determined to be occupied when a key card is in the electronic lock, when motion sensing or device control is performed, when a door lock is locked or unlocked, when a sensor performs a sensing operation or a device connected to a network is controlled, when a user's mobile phone, tablet device, or notebook computer is accessed while being connected to a WLAN, or when a user's wearable device or another identification device is connected to a hotel network.

In the embodiment of the present invention, a space is determined to be unoccupied when a key card is not in the electronic lock, when a door lock is unlocked or locked, when a sensor does not perform a sensing operation for a predetermined time or a control operation is not generated in a device connected to a network, when a user's mobile phone, tablet device, or notebook computer is accessed while being connected to a WLAN in a space other than the space for which this determination is performed, or when a user's wearable device is not detected by a GW.

The device connected to the network may be an air conditioner, a refrigerator, an audio system, a light, a stand, a hair dryer, or a coffee pot, and other devices may also be connected to the network. The sensor may be a motion sensor, a contact sensor, a magnetic sensor, or the like.

The above-described conditions may be combined to determine occupancy or non-occupancy, and when a predetermined number or more of conditions are satisfied, occupancy or non-occupancy may be determined.

Next, a method of collecting and processing data for recognizing a space occupancy/non-occupancy pattern of a user, according to an embodiment of the present invention, will be described.

For efficient energy control, it is necessary to predict a time of non-occupancy and a time of occupancy of a user. To this end, in an embodiment of the present invention, information on surroundings of a building or a space usage pattern of another user may also be identified in order to determine the space occupancy/non-occupancy pattern of the user.

User data such as the user's gender and age, the purpose of the user's trip in which the space is used, and the like, environment data such as a date, a day of the week, weather, and the like, and data about a time of non-occupancy and a time of occupancy may be collected to extract the space occupancy/non-occupancy pattern of the user.

The collected data is distinguished (or sorted) according to types of the user data and the environment data, and the distinguished (or sorted) data is stored in units of a time interval. The probability of non-occupancy is calculated and stored on the basis of the data stored in units of the time interval. In addition, time distribution from the time of non-occupancy to the time of occupancy is stored, and distribution for a period of time of the user's non-occupancy in a particular time period is stored based on the data stored in units of the time interval.

Furthermore, in the case of the user's non-occupancy using a space (e.g., a room used for a particular function) of a building in a particular time period, unoccupied duration (i.e., a period of the non-occupancy) may also be predicted. That is, the user's unoccupied duration using the space (e.g., the room) of the building may be predicted based on a current or previous occupancy/non-occupancy pattern for the user, which may relate to a period for which an event is going to be held in the area (e.g., a downtown area of a city) where the building is located, the characteristic of the area where the building is located (i.e., a tourist area or an office-concentrated area), and the purpose of the user's trip in which the space is used. When such data is accumulated to a certain extent, an initial value may be set and used for each non-occupancy pattern. In addition, prediction accuracy of the unoccupied duration may be enhanced based on a point of interest (hereinafter, referred to as POI) around the building.

For example, the user's unoccupied duration may also be predicted by collecting the characteristic of the area where the building is located and opening and closing time of main facilities around the building, such as restaurants, tourist sites, shopping centers, amusement facilities, event sites, and the like. For example, in Las Vegas, guests of a hotel frequently use casino facilities at night; therefore, if the guests go out in the evenings, they most likely do not come back to their rooms until late at night. In San Jose, guests on a business trip generally go out for meetings during the daytime; therefore, if the guests go out in the morning, they do not often come back until sunset. In Hawaii, guests in accommodations are mainly tourists; therefore, they frequently go out in the daytime. As another example, during the Consumer Electronics Show (CES), guests of a hotel generally go out at the opening time of the show and come back to their rooms after the closing time of the show. Thus, a guest's non-occupancy pattern varies with characteristics of the area where a building is located.

As another example, the user's unoccupied duration may also be predicted by the purpose of the user's trip in which the space is used. When several guests (for example, including children) of a hotel stay in a room, the room is more likely used in the users' trip with the purpose of travelling; and when a user stays alone, the room is more likely used in the user's trip with the purpose of business. An occupancy/non-occupancy pattern may be extracted through a combination of such information, and thus the user's unoccupied duration may be predicted.

Next, a method of performing setback control based on a user's non-occupancy pattern, according to an embodiment of the present invention, will be described.

In an embodiment of the present invention, the length of a time interval actually required for energy saving may be calculated through analysis of energy consumption according to a temperature change, and setback control may be performed by combining the calculated length of the time interval with a user's non-occupancy pattern.

Figure 1B:
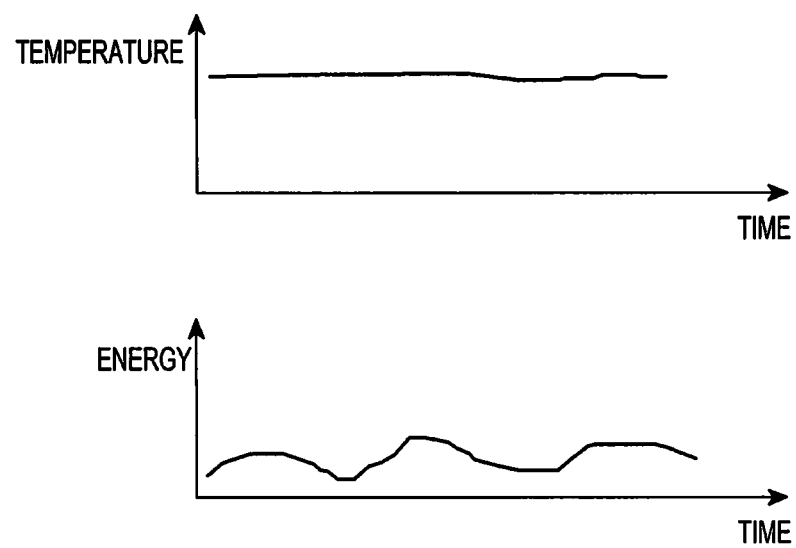

FIGS. 1A and 1B illustrate a change in temperature and energy consumption according to an on/off operation of a heater.

FIG. 1A illustrates a change in temperature and energy consumption when the heater is turned off and then turned on at a later time, and FIG. 1B illustrates a change in temperature and energy consumption when the heater continues to be remain on without power-off. Using the energy consumption graphs of FIGS. 1A and 1B, time interval T required for energy saving may be obtained by comparing energy consumption when the heater remains on with energy consumption when the heater is turned off and then on again. Therefore, setback control may be performed using the time interval T, thereby saving energy.

A method of calculating the time interval T required for energy saving will be described.

HVAC systems deteriorate differently over time, and have different, heat transfer rates, use efficiency, energy consumption, and functions. Therefore, in the embodiment of the present invention, the minimum time interval required for energy saving is extracted for each HVAC system. The extracted information may be stored in a server or a GW. In the case of heating, time interval T is obtained by comparing energy (A) required to maintain temperature at a uniform level with energy (B) required to decrease the temperature and then increase it again. When A=B is satisfied, the time interval T satisfying A=B is the minimum time interval required for energy saving. That is, if a time interval (e.g., a time period of non-occupancy) is greater than T, the effort for the energy saving (the heater being turned off and then turned on to reach the original temperature) should be performed. If the time interval (e.g., a time period of non-occupancy) is smaller than T, the effort for the energy saving is not necessary and the heater should be kept on. The time T may be determined using a change in temperature according to the time when the HVAC system is turned off and a change in temperature and energy consumption according to time when the HVAC system is turned on. Through a control history, a system manager may find how much time is required for energy saving.

More specifically, a rate of change in temperature per energy consumed for each HVAC system is stored in the server or the GW. Depending upon deterioration of the systems, there may be a difference in temperature change despite the same energy consumption. Temperature-change/energy-consumption values for each time/external temperature are also stored in the server or the GW. When the information is stored in the server, the server may compare a current room temperature with a target temperature to calculate and control a pre-heating/pre-cooling start time of the HVAC system according to an arrival time of a user. When the information is stored in the GW, when the server informs the GW of the remaining time until the arrival of a user, the GW may calculate a pre-heating/pre-cooling start time in view of the capability of the HVAC system and control the HVAC system according to the calculated time.

Figure 2:
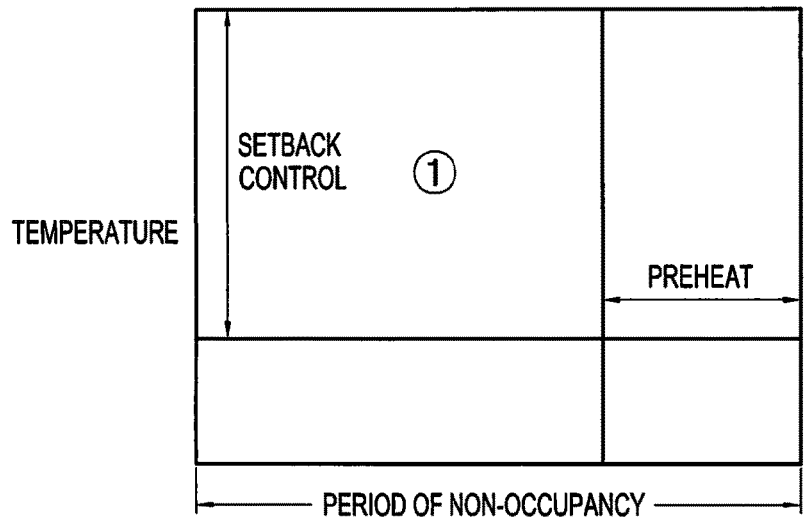
FIG. 2 illustrates a rectangular model for setback control according to an embodiment of the present invention.

From an HVAC system manager, a desired energy saving rate and a desired temperature recovery time may be previously received and stored, and then used in setback control. To this end, a rectangle for the setback control is created as illustrated in FIG. 2. Referring to FIG. 2, the horizontal axis represents a period of non-occupancy, the vertical axis represents temperature, and region 1 represents an energy saving rate. When the system manager sets a desired energy saving rate, the total area of region 1 is set, and when the system manager sets time required for returning to a desired temperature, the pre-heating/pre-cooling time of FIG. 2 is adjusted. However, since the total area of region 1 is constant, a setback control time is also adjusted as the pre-heating/pre-cooling time is adjusted.

Next, a method of initiating setback control, according to an embodiment of the present invention, will be described.

In the embodiment of the present invention, the setback control is initiated using a probability of occupancy/non-occupancy of a user and probability distribution of a period of non-occupancy. That is, the probability distribution for a period of non-occupancy generated for each time interval is obtained through the analysis of the user's occupancy/non-occupancy pattern, and the setback control is performed when a probability of the non-occupancy period, which within the time interval becomes greater than time T required for energy saving, is larger than a preset value of a.

Next, a dynamic setback control method based on a user's occupancy pattern, according to an embodiment of the present invention, will be described.

In the embodiment of the present invention, setback control is performed based on the user's arrival time with respect to the period of non-occupancy, thereby achieving energy saving. In this case, the setback control is desirably performed so that the user may feel comfortable on his/her arrival.

Various methods may be used to predict the user's arrival time. For example, when the location of the user is identified through the connection to an external network, the user's arrival time may be predicted based on a distance from the location of the user to the location of a building. In addition, the user's arrival time may also be predicted using distribution for a period of non-occupancy based on the user's occupancy probability for each time interval or based on the time interval for which the non-occupancy has been generated.

In general temperature control (except for a case of rapidly increasing temperature), adjustable temperature ranges per time of HVAC systems may be extracted based on energy consumption and used in the setback control. In this case, the adjustable temperature ranges per time may be different according to deterioration of the system, heat transfer rates, use efficiency, and functions of the HVAC systems. Accordingly, for each HVAC system, the range in which temperature can be adjusted for t minutes is calculated by collecting and processing temperature adjustment related data, and the calculated value is stored in a server or a GW and used in the setback control.

A target temperature may be determined depending upon a characteristic of a room, a user's activity state, temperature adjustment by the user, an energy saving rate, and a desired temperature recovery time according to a manager's request. The determined target temperature is stored for each room. The characteristic of a room represents directions of windows, an amount of sunshine, a location of a temperature detection sensor, and the like, and the user's activity state is identified by detecting the user's motion in an occupancy state or the use of electronic devices in the room and represents whether the user is in an awakening state or in a restful state such as a sleep state. When about 30 minutes to one hour passes after a user's arrival, an amount of heat released from the user's body is in a normal state. Therefore, if a request for changing temperature is not generated by the user even after the user's arrival is identified and then 30 minutes to one hour passes, the current temperature may be determined as the target temperature. When a request for changing temperature is generated by the user while a room is maintained at a target temperature stored in a system, if an additional request for temperature change is not generated for a predetermined period of time after the temperature is changed, the temperature at this time is set to a new target temperature and stored.

A method of extracting a target temperature using a user's feedback, according to an embodiment of the present invention, will be described.

When a user arrives and enters a room for the first time, a target temperature may be extracted with reference to other users in a similar condition and temperature control histories of other rooms in a similar condition and may be set as an initial target temperature. When the current temperature of the room is the same as a preset initial target temperature, if the user enters the room and arbitrarily adjusts the temperature, it may be determined that the user is not satisfied with the current temperature (i.e., the initial target temperature). In contrast, if the user does not adjust the temperature, it may be determined that the user is satisfied with the initial target temperature. When the user adjusts the temperature, a difference between the currently set initial target temperature and the temperature arbitrarily changed by the user may be stored and then used to set an initial target temperature of a new room.

According to another embodiment of the present invention, a target temperature may be extracted using a user's feedback as follows. That is, a user interface (UI) including meanings, such as very cold, cold, less cold, good, less hot, hot, and very hot, is provided to a user through a device, such as a temperature control device or a user terminal, which is connected to a temperature control system through a network, and when the user selects an item corresponding to his/her feeling, a current temperature and the item selected by the user are stored in a GW or a server. For example, when the user selects an item 'cold,' if the current temperature is 18° C., the current temperature and the selected item may be stored in the form of "Guest a-type: 18° C., Cold." Thereafter, when a target temperature for the same user is extracted, the extracted target temperature is stored together with the previously stored information. For example, when a comfort temperature of 23° C. is detected, the current temperature, the selected item, and the comfort temperature may be stored in the form of "Guest a-type: 18° C., Cold, Comfort temperature of 23° C." If another user stays in a similar type of room and feedback of the same feeling is generated at the same temperature, a target temperature stored by the other user staying in the similar type of room may be automatically set as a target temperature.

According to another embodiment of the present invention, setback control may be performed based on a user's non-occupancy period probability, and a system manager's desired energy saving rate and desired temperature recovery time.

Figure 3:
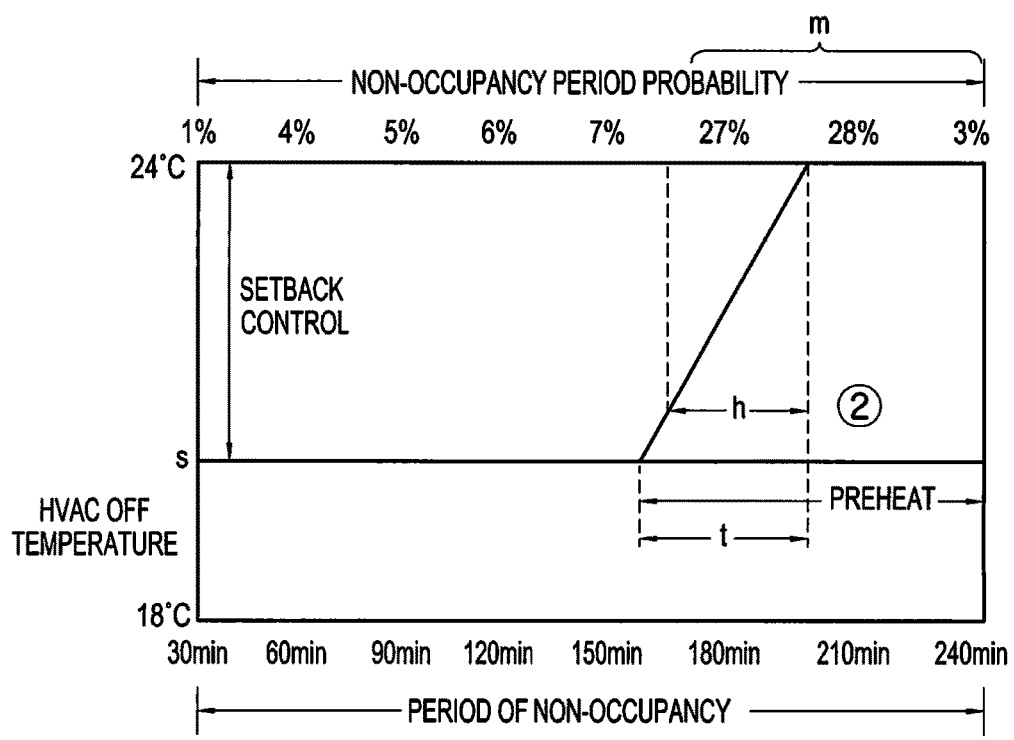
FIG. 3 illustrates an example of performing setback control for heating based on a non-occupancy period probability and a system manager's desired energy saving rate and desired temperature recovery time according to an embodiment of the present invention.

FIG. 3 illustrates an example of performing setback control for heating based on a non-occupancy period probability and a system manager's desired energy saving rate and desired temperature recovery time according to an embodiment of the present invention.

In FIG. 3, the vertical axis represents temperature, and a target temperature is displayed as 24° C. s represents the minimum temperature at which setback control is performed, and the setback control is performed between the temperature s and the target temperature. That is, when temperature is decreased to s or lower, an HVAC system is turned off. In the case of heating, the temperature s is greater than or equal to a temperature when the HVAC system is turned off, and in the case of cooling, the temperature s is less than or equal to a temperature when the HVAC system is turned off. A non-occupancy period is displayed on a lower side of the horizontal axis, and a non-occupancy period probability for each time period is displayed on an upper side of the horizontal axis. A slope representing a change in temperature according to pre-heating may vary with the capability of the HVAC system. The total time required for returning from the setback control start temperature s to the target temperature is referred to as t, the remaining time until returning to the target temperature after user's return is detected is referred to as h, the total sum of non-occupancy period probabilities in the remaining time h and the time from the target temperate is reached to the end of the non-occupancy period is referred to as m %, and a probability that a user will come back within the time h is referred to as n %.

The setback control start temperature p for satisfying the probability n % may be calculated by Equations (1) and (2) as follows. Equation (1) corresponds to heating, and Equation (2) corresponds to cooling.

$$p=\min\{p|m<100-n\} \quad (1)$$

$$p=\max\{p|m<100-n\} \quad (2)$$

Next, an HVAC control method using a mathematical analysis scheme, according to an embodiment of the present invention, will be described.

Figure 4:
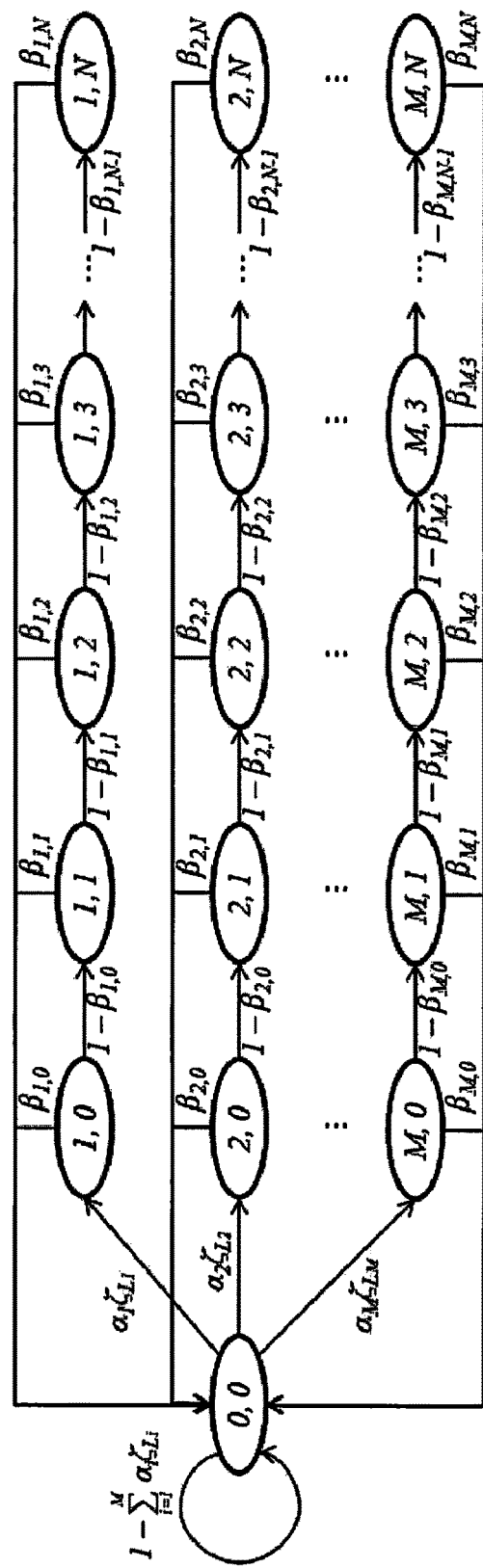
FIG. 4 illustrates a Markov chain model for setback control according to an embodiment of the present invention.

In order to analyze an HVAC system, the Markov chain model is made as illustrated in FIG. 4. The Markov chain of FIG. 4 represents two states of a divided time interval i and unoccupied duration in the HVAC system. In the chain of FIG. 4, (x, y) are presented, where x means a group and y means the unoccupied duration. If a non-occupancy is started, the unoccupied duration starts from "0" and is determined according to $\beta_{ij}$. In FIG. 4, $\beta_{ij}=\gamma_i^{[j]}/(\Sigma_{k=j}^{N_{\gamma_i}}\gamma_i^{[k]})$, where $\beta_{ij}$ represents a probability that a user will come back to a room after j time in i-th time interval, and $\gamma_i^{[k]}$ represents a probability that a user will come back to a room at time k in the i-th time interval. $\gamma_i^{[k]}$ may be calculated using the user's occupancy/non-occupancy probability and probability distribution of a non-occupancy period that are extracted based on previously collected and stored data. $\alpha_i$ is a probability of non-occupancy in the time interval i and may be calculated based on the previously collected and stored data. $\zeta_{L_i}$ represents a probability that the non-occupancy period may save energy. $L_i$ is the minimum time of the non-occupancy period required for energy saving. When the non-occupancy period is smaller than $L_i$, power is changed from off to on for a short period of time so that energy consumption can increase. A probability that the non-occupancy is maintained for a longer period than $L_i$ by which energy saving can be achieved is $\zeta_{L_i}$. When P represents a state transition probability matrix of the Markov chain, $\Pi P=\Pi$, and $\Sigma_i^M \Sigma_j^N \pi_{i,j}=1$. A steady state probability may be calculated in the Markov chain of FIG. 4 using $\Pi=(\pi_{0,0}, \pi_{0,1}, \pi_{0,2}, \ldots, \pi_{M,N})$. In addition, using the calculated steady state probability, energy consumption $E_{total}$ may be calculated by the following Equation (3).

$$E_{total}=\Sigma_{i=1}^M \Sigma_{j=1}^N \gamma_i^{[j]}\{E_{setback}^{[t]}(\Sigma_{k=i}^{\min(j,s)}{}^a\pi_{i,k})+E_{setback}^{[t]}(\Sigma_{k=a+1}^{\min(j,s)}\pi_{i,k})+E_{recov}^{[t]}(\Sigma_{k=\min(j,s)+1}^{b}\pi_{i,k})+E_{conti}^{[t]}(\Sigma_{k=b+1}^{N}\pi_{i,k})\}+E_{conti}^{[t]}\pi_{0,0} \quad (3)$$

s denotes a pre-heating/pre-cooling start time, a=max(min(j,s)-$T_{L_c}$,1), and b=min(min(j,s)+$T_{H_c}$,N). $E_{setback}^{[t]}$ denotes energy consumption during setback control, $E_{recov}^{[t]}$ denotes energy consumption until returning to a target temperature in the setback control, and $E_{conti}^{[t]}$ denotes energy consumption required for maintaining temperature after returning to the target temperature.

Since X is a random variable representing a recovery time required for returning from the current temperature to a desired temperature when a user arrives a room and a probability generating function for X $G(z)=E(z^x)=\Sigma_{x=0}^{\infty} p(x) z^x$, $G(z)$ will be represented by Equation (4) as follows.

$$G(z)=\Sigma_{i=1}^M \alpha_i \zeta_{L_i}\{\Sigma_{j=1}^{N_{\gamma_i}[j]}(\Sigma_{k=1}^{c_{\gamma_i[k]}} z^{\min(T_{lim},k)}+\Sigma_{k=c+1}^{d_{\gamma_i[k]}} z^{T_{lim}}+1_{\{k>c+1\}}\cdot\Sigma_{k=d+1}^{\min(j,s)}\gamma_i^{[k]} z^{\min(j,s)-k}+\Sigma_{k=\min(j,s)+1}^{N_{\gamma_i}[k]} z^0)\} \quad (4)$$

$T_{lim}$ denotes a time required for returning from a setback control start temperature to a target temperature. c=min($T_{lim}$, min(j,s)), d=min(j,s)-$T_{lim}$, and $1_{\{k\}}$ is an indicator function that has a function value of 1 when k exists in a set and a function value of 0 when k does not exist in the set.

Using Equations obtained in such a manner, a setback control start temperature and a pre-heating/pre-cooling start time during non-occupancy may be optimized under the condition such as Equation (5) below.

$$\arg_{T_{setback},s} E_{total}(T_{setback}, s) \quad (5)$$
$$\text{s.t. } P\{X < \text{Target\_Time}\} > \text{CF\_level}(\%)$$

Target_Time denotes an allowable time for returning to a target temperature when a user comes back to a room, and CF_level (%) denotes a ratio of data satisfying a target temperature recovery time to the whole data. Therefore, using the conditions of Equation (5), a setback control start temperature and a pre-heating/pre-cooling start time may be determined which have the maximum energy saving rate in the range of satisfying the target condition (Target_Time and CF_level (%)).

Figure 5:
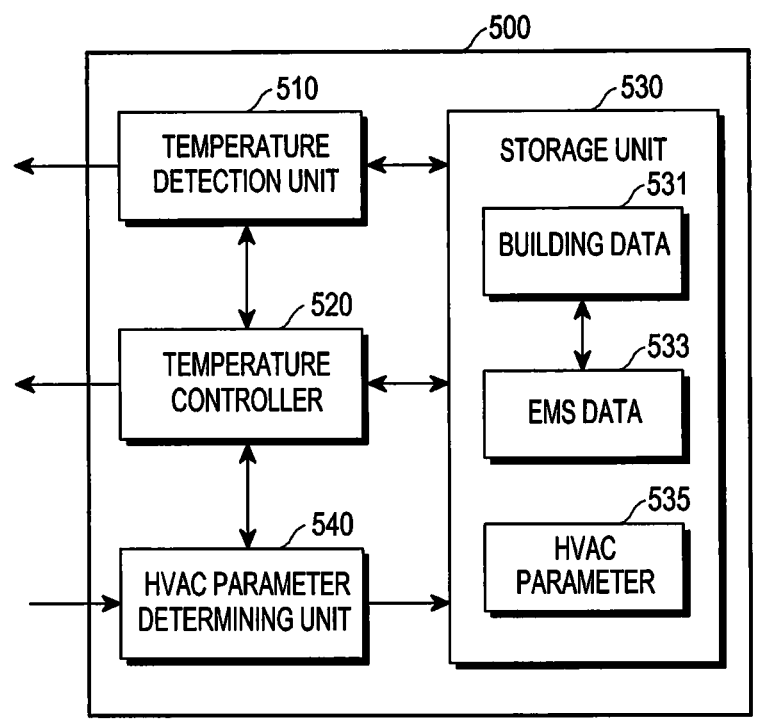
FIG. 5 is a schematic block diagram of a system for performing setback control according to an embodiment of the present invention.

FIG. 5 is a schematic block diagram of a system for performing setback control according to an embodiment of the present invention.

Referring to FIG. 5, a setback control system 500 according to an embodiment of the present invention includes a temperature detection unit 510, a temperature controller 520, a storage unit 530, and an HVAC parameter determining unit 540. The storage unit 530 may include building data 531, Energy Management System (EMS) data 533, and an HVAC parameter 535. The building data 531 includes user data such as a user's gender, age, and purpose of travelling (a trip in which the space is used), environment data such as a date, a day of the week, and weather, occupancy and non-occupancy time data, a user preferred temperature, and ambient environment related data. The EMS data 533 includes a time interval of a corresponding building set for month/day/day of week/hour, a temperature value set in units of an interval, operation reservation information of a setback control system, and information on an amount of used energy. The building data 531 may be connected to a web server or a hotel information system to store guest information, local event information, and ambient POI information.

The temperature detection unit 510 detects the room temperature using a temperature sensor, and the temperature controller 520 controls the temperature of the room through the setback control method according to the embodiment of the present invention. The storage unit 530 distinguishes data for setback control into the building data 531 and the EMS data 533 and stores them according to the data collecting and storing method according to the embodiment of the present invention. The HVAC parameter determining unit 540 stores, in the HVAC parameter 535, a desired energy saving rate and time required for pre-heating/pre-cooling that are input by a system manager through an input unit. In addition, the HVAC parameter determining unit 540 calculates a setback control start temperature and a pre-heating/pre-cooling start time using a mathematical analysis result and stores the calculated results in the HVAC parameter 535.

Figure 6:
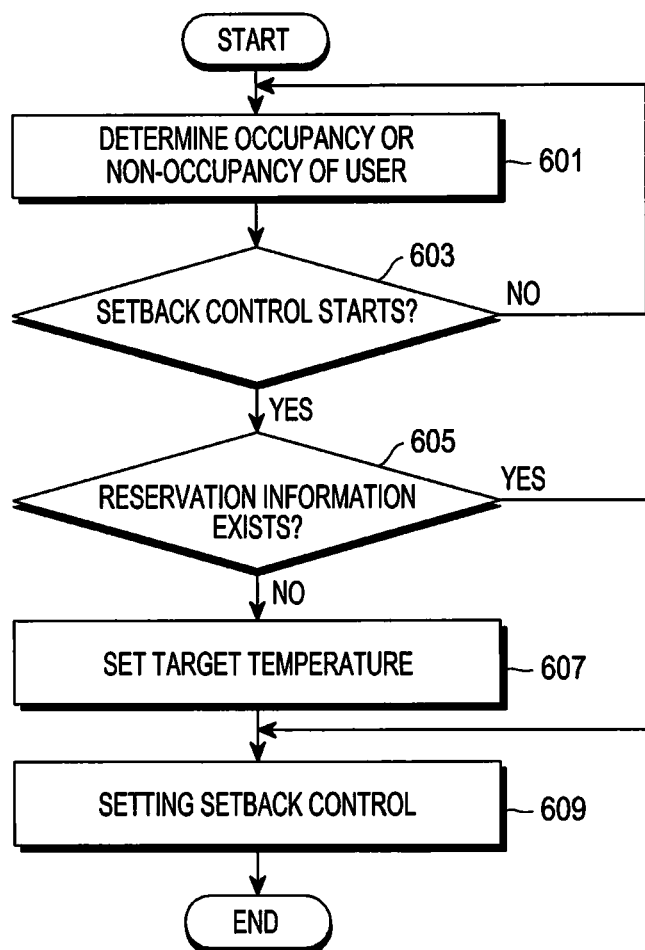
FIG. 6 is a flowchart schematically illustrating a setback control process according to an embodiment of the present invention.

FIG. 6 is a flowchart schematically illustrating a setback control process according to an embodiment of the present invention.

Referring to FIG. 6, occupancy or non-occupancy of a user is determined using a door lock or a motion sensor in step 601, and in the case of the user's non-occupancy, it is determined whether to start setback control in step 603. That is, when the non-occupancy period in a time interval becomes greater than time T required for energy saving, and a probability of the non-occupancy period is larger than a preset value of a, it is determined to start setback control using the user's occupancy/non-occupancy probability and probability distribution of a period of non-occupancy that are calculated based on user data such as a gender, an age, and an purpose of travelling (a trip in which the space is used), environment data such as a date, a day of the week, and weather, occupancy and non-occupancy time data, and a characteristic of an area where a building is located. When it is determined to start the setback control, the presence or absence of reservation information for operating a setback control system is identified in step 605, and when the reservation information exists, the setting for the setback control is set according to the reservation information (e.g., the default target temperature) in step 609. When the reserved information does not exist, a target temperature is set based on data stored in the storage unit 530 in step 607). As described above, the target temperature (e.g., comfort temperature) is set using the previously collected and stored building data with reference to a temperature control history of a user and a room having the similar characteristic, or is set based on a user's feedback.

When an HVAC parameter according to a manager's input is used, in step 607 of FIG. 6, a setback control start temperature is calculated based on an energy saving rate and a target temperature recovery time that are input though the input unit. The setting for the setback control is set according to the calculated value in step 609.

When the mathematical analysis result is used as described above, the setting for the setback control is set in step 609 based on the setback control start temperature and the pre-heating/pre-cooling start time, which are determined under the conditions of Equation (5), without execution of step 607 of FIG. 6.

Figure 7:
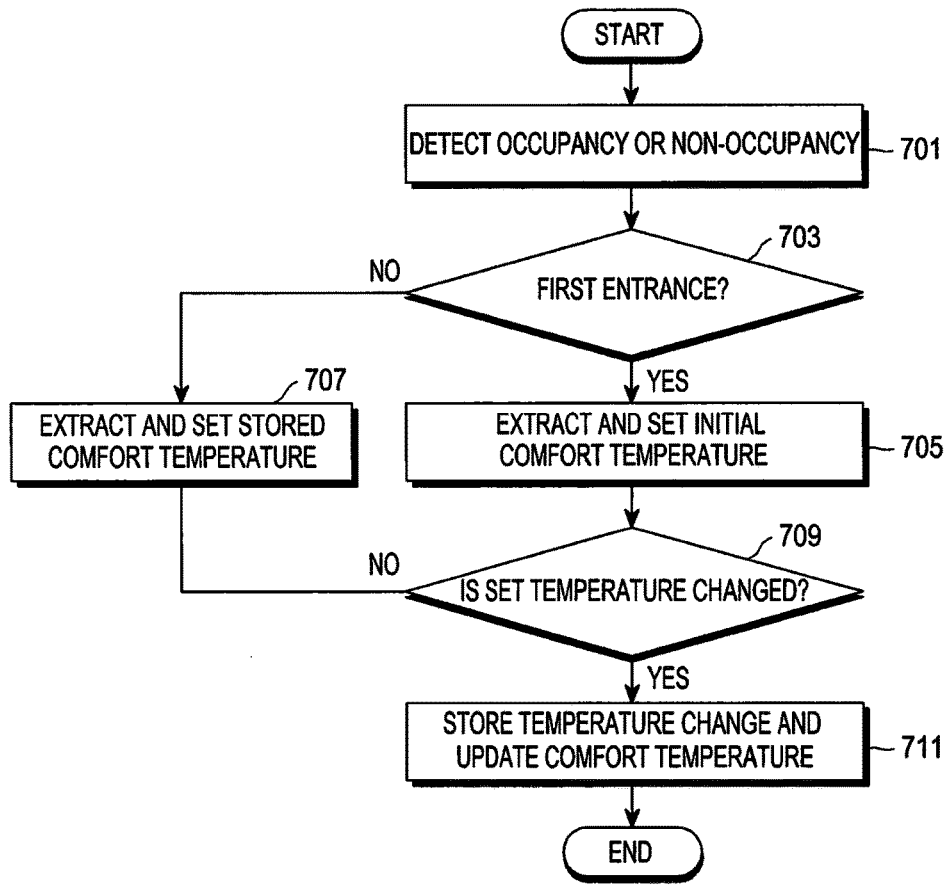
FIG. 7 is a flowchart schematically illustrating a process of extracting a target temperature and correcting the target temperature in response to feedback according to an embodiment of the present invention.

FIG. 7 is a flowchart schematically illustrating a process of extracting a target temperature and correcting the target temperature in response to feedback according to an embodiment of the present invention.

Referring to FIG. 7, when occupancy of a user is detected in step 701, it is determined whether the user checks in and enters a room for the first time in step 703. When it is determined that the user enters the room for the first time, a target temperature (e.g., a comfort temperature) is extracted with reference to a temperature control history of other users and rooms under the previously stored similar condition as described above, the extracted target temperature is set as an initial target temperature, and temperature control is performed based on the set temperature in step 705. When it is determined in step 703 that the user does not enter the room for the first time but has been in the room before, a target temperature previously stored by the user is extracted, the extracted target temperature is set as an initial target temperature, and temperature control is performed based on the set temperature in step 707. Thereafter, if the set temperature is changed by the user at a time point when the current temperature of the room is the same as the initial target temperature in step 709, a difference between the current set initial target temperature and the temperature changed by the user is stored, and the user's target temperature is updated in step 711. The stored value may be used to set initial target temperatures for users and rooms in a similar condition.

According to another embodiment of the present invention, when the user's feedback is used, the user's feeling (e.g., very cold, cold, less cold, good, less hot, hot, and very hot) for the current temperature may be fed back through a UI of a device, and information input by the user may be stored together with the current temperature and used as an initial target temperature for another user staying in a similar type of room.

Figure 8:
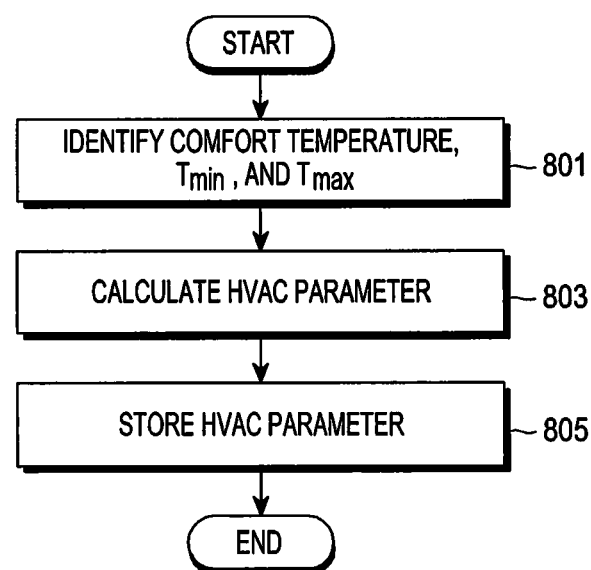
FIG. 8 is a flowchart illustrating a process of determining an HVAC parameter for setback control according to an embodiment of the present invention.

FIG. 8 is a flowchart illustrating a process of calculating an HVAC parameter for setback control according to an embodiment of the present invention.

Referring to FIG. 8, the target temperature stored in the end of the process of FIG. 7 is extracted, and the room temperature Tmin maintained when a heating system is turned on or the room temperature Tmax maintained when a cooling system is turned on are identified in step 801. Next, a setback control start temperature and a pre-heating/pre-cooling start time are calculated based on a desired energy saving rate and a target temperature recovery time that are input and stored by a system manager in step 803. If the system manager inputs the desired energy saving rate, the setback control start temperature and the pre-heating/pre-cooling start time may be calculated by optimizing the target temperature recovery time based on the distribution of the energy consumption and the target temperature recovery time that are calculated on the basis of Equations (4) to (5). If the system manager inputs the desired target temperature recovery time, the setback control start temperature and the pre-heating/pre-cooling start time may be calculated by optimizing the energy saving rate based on the distribution of the energy consumption and the target temperature recovery time that are calculated on the basis of Equations (4) to (5). Thereafter, the calculated parameters are stored in step 805.

Figure 9:
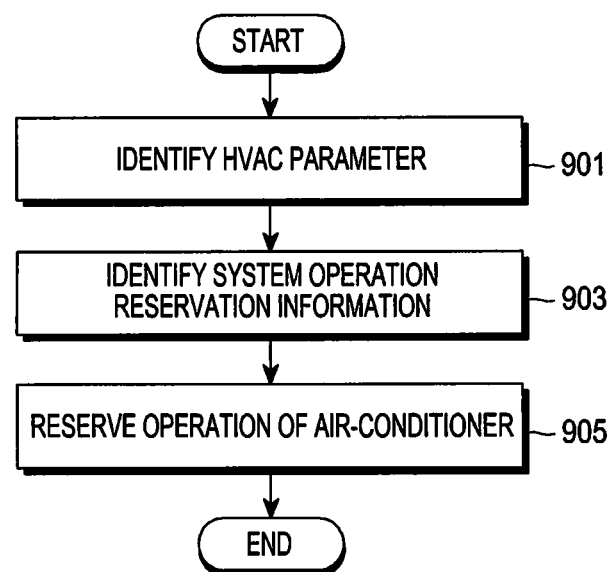
FIG. 9 is a flowchart illustrating a method of reserving an operation of a system for setback control according to an embodiment of the present invention.

FIG. 9 is a flowchart illustrating a method of reserving an operation of a system for setback control according to an embodiment of the present invention.

Referring to FIG. 9, HVAC parameters calculated thorough processes illustrated in FIG. 8 are identified in step 901, and system operation reservation information is identified based on the identified HVAC parameters in step 903. An operation of a system for setback control is reserved based on the system operation reservation information in step 905.

The processes illustrated in FIGS. 6 to 9 do not have to be sequentially performed, and some of the processes may be performed in a different sequence without affecting setback control efficiency.

Figure 10A:
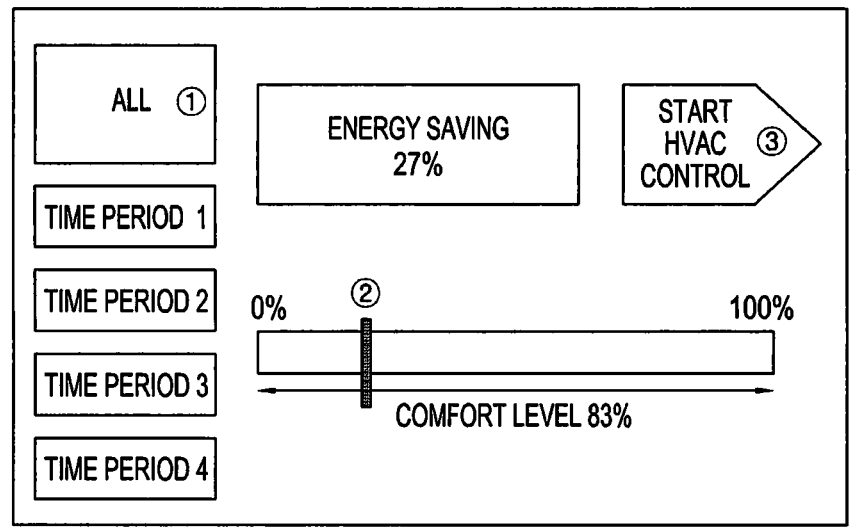
FIGS. 10A to 10C illustrate user interfaces for setback control according to an embodiment of the present invention.
Figure 10B:
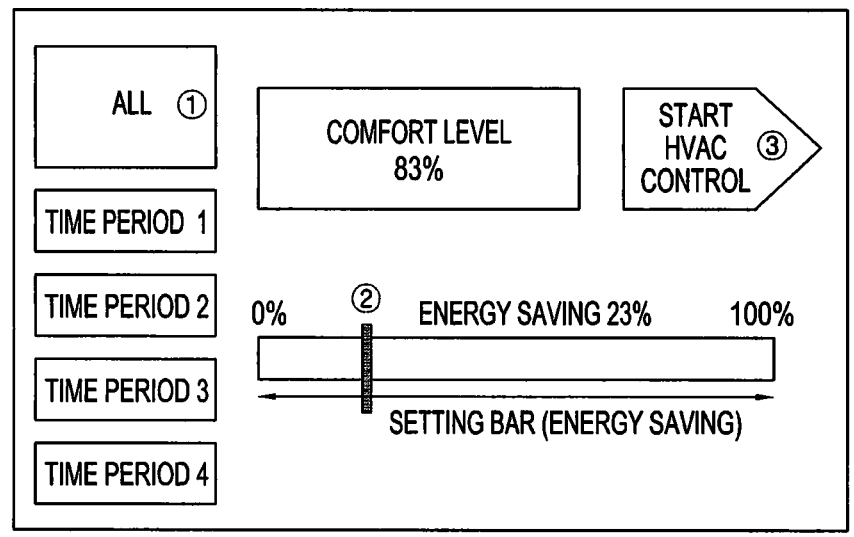
Figure 10C:
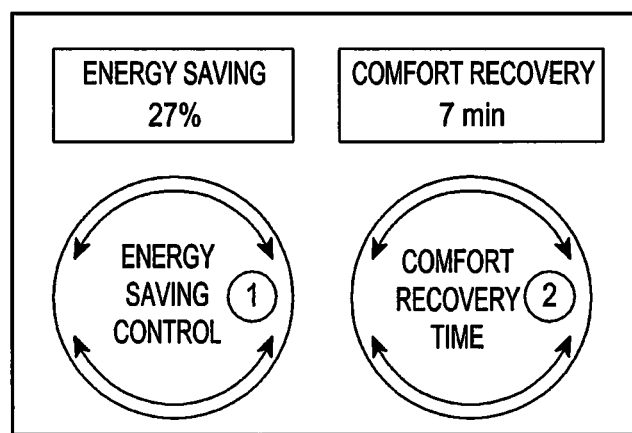

FIGS. 10A to 10C illustrate examples of an UI for an input of HVAC parameters for a system manager according to an embodiment of the present invention. A comfort level representing time required to reach a comfort temperature and an energy saving rate have a trade-off relation, and the manager may adjust one of the two parameters to change the other parameter.

Referring to FIG. 10A, the system manager may select a time period to set an HVAC parameter and move a setting bar leftward and rightward to set a desired comfort level, and when the comfort level is selected, an energy saving rate corresponding to the selected comfort level is displayed as a number on a screen.

Referring to FIG. 10B, the system manager may select a time period to set an HVAC parameter and move a setting bar leftward and rightward to set a desired energy saving rate, and when the energy saving rate is selected, a comfort level corresponding to the selected energy saving rate is displayed as a number on a screen.

Referring to FIG. 10C, the system manager may set a desired energy saving rate by turning an energy saving control button. When the system manager changes the energy saving rate, a server may calculate the minimum comfort recovery time to satisfy the energy saving rate based on the rectangular region illustrated in FIG. 2 and may display the calculated minimum comfort recovery time through the UI to the system manager.

When the system manager inputs a desired comfort recovery time, the server may calculate the maximum reducible energy saving rate based on the rectangular region illustrated in FIG. 2 and may display the calculated maximum reducible energy saving rate through the UI to the system manager.

As described above, in accordance with the setback control method according to the embodiment of the present invention, data can be collected and grouped in view of a characteristic of an area where a building is located and therefore, can be used not only for setback control but also for building management. In addition, heating/ventilation/air-conditioning control can be efficiently performed using information on surroundings of a hotel, another user's real-time occupancy/non-occupancy pattern, and a method of predicting a time of occupancy of a user based on information of occupancy and information thereof, thereby reducing energy. Further, it is possible to solve the inefficiency of energy usages and user inconveniences that are caused by performing setback control immediately after the non-occupancy of a user without consideration of a time of occupancy of the user as in the related art. Furthermore, setback control can be performed in view of a characteristic (e.g., deterioration, efficiency, a function, etc.) of an HVAC system. Also, the setback control can be performed using a user's occupancy/non-occupancy pattern, thereby achieving a higher energy saving rate while considering the user's convenience, and efficiently operating a building through energy saving prediction. Moreover, an energy saving rate or a comfort level that a manager wants can be reflected, thereby operating an HVAC system reflecting the manager's demands.

Certain embodiments of the present invention shown and described in this specification and the drawings correspond to specific examples presented in order to easily explain technical contents of the present invention, and to help comprehension of the present invention, but are not intended to limit the scope of the present invention. That is, it will be apparent to those skilled in the art to which the present invention pertains that different modifications and changes may be made based on the technical idea of the present invention without departing from the spirit and scope of the present invention as defined by the appended claims and any equivalents thereof.

What is claimed is:

1. A method for controlling temperature in a temperature control system, the method comprising:
    determining non-occupancy of a space;
    determining whether to start setback control based on a predicted non-occupancy period of the space and a minimum time interval of the non-occupancy period to start the setback control for energy saving;
    determining a target temperature of the space;
    calculating a setback control start temperature based on the target temperature; and
    performing the setback control according to the calculated setback control start temperature.

2. The method of claim 1, wherein the setback control start temperature is calculated further based on a predetermined energy saving rate.

3. The method of claim 1, wherein the setback control start temperature is calculated further based on a predetermined temperature recovery time.

4. The method of claim 3, wherein the predetermined temperature recovery time is calculated based on a predetermined energy saving rate.

5. The method of claim 1, wherein the target temperature is determined based on at least one of a characteristic of the space, a motion state of at least one user in the space, temperature control data of the space, an energy saving rate, feedback data of the at least one user according to temperature, temperature control data of another space, and a temperature recovery time.

6. The method of claim 1, further comprising:
    storing a difference between a first set temperature and a changed set temperature, if a change of the first set temperature by at least one user is detected; and
    updating the target temperature based on the difference between the first set temperature and the changed set temperature.

7. The method of claim 1, wherein an initial target temperature of another space is set based on the target temperature.

8. The method of claim 1, wherein the setback control start temperature is determined based on:
    a total sum of probabilities of the non-occupancy period during a time in which a remaining time until returning to the target temperature is less than or equal to a predetermined time, and
    a probability of detection of occupancy of the space within the predetermined time.

9. The method of claim 1, wherein the non-occupancy period is predicted based on previously collected data which includes at least one of user data, environment data, and building data, wherein the user data comprises at least one of data of gender and age of at least one user of the space, an intention of stay of the at least one user, a period of stay of the at least one user, a number of at least one partner of the at least one user, and an age of the at least one partner, wherein the environment data comprises at least one of data of a date, a day of a week, and weather, and wherein the building data comprises at least one of data of a characteristic of an area where the space is located, information on surroundings of the space, data about events around the space, and a past or current occupancy/non-occupancy pattern of the space.

10. The method of claim 1, wherein the setback control is determined to start if the non-occupancy period is greater than the minimum time interval.

11. The method of claim 10, wherein the minimum time interval satisfies that energy required to maintain the target temperature while an apparatus for controlling temperature is on is equal to energy required to reach to the target temperature while the apparatus for controlling temperature is turned off and on again.

12. An apparatus for controlling temperature in a temperature control system, the apparatus comprising:
a storage unit configured to store user related information and space related information;
a temperature detection unit configured to determine non-occupancy of a space and to detect an inner temperature of the space; and
temperature controller configured to determine whether to start setback control based on a predicted non-occupancy period of the space and a minimum time interval of the non-occupancy period to start the setback control for energy saving, to determine a target temperature of the space, and to perform the setback control according to a setback control start temperature that is determined based on the target temperature.

13. The apparatus of claim 12, wherein the setback control start temperature is calculated further based on a predetermined energy saving rate.

14. The apparatus of claim 13, wherein the predetermined energy saving rate is calculated based on a predetermined temperature recovery time.

15. The apparatus of claim 12, wherein the setback control start temperature is calculated further based on a predetermined temperature recovery time.

16. The apparatus of claim 12, further comprising:
an input unit configured to receive at least one of an energy saving rate and a temperature recovery time and to store at least one of the received energy saving rate and the received temperature recovery time in the storage unit.

17. The apparatus of claim 16, further comprising:
a parameter determining unit configured to calculate the setback control start temperature, which correspond to the energy saving rate or the temperature recovery time, based on a pre-stored algorithm.

18. The apparatus of claim 12, wherein the target temperature is determined based on at least one of a characteristic of the space, a motion state of at least one user in the space, temperature control data of the space, an energy saving rate, feedback data of the at least one user according to temperature, temperature control data of another space, and a temperature recovery time.

19. The apparatus of claim 12, wherein if a change of a first set temperature by at least one user is detected, the temperature controller is further configured to store, in the storage unit, a difference between the first set temperature and a changed set temperature and to update the target temperature based on the difference between the first set temperature and the changed set temperature.

20. The apparatus of claim 12, wherein the temperature controller is further configured to set an initial user target temperature of another space based on the target temperature.

21. The apparatus of claim 12, wherein the setback control start temperature is determined based on:
a total sum of probabilities of the non-occupancy period during a time in which a remaining time until returning to the target temperature is less than or equal to a predetermined time, and
a probability of detection of occupancy of the space within the predetermined time.

22. The apparatus of claim 12, further comprising:
a user interface unit configured to receive at least one of an energy saving rate and a temperature recovery time,
wherein the temperature controller is configured to:
determine the temperature recovery time corresponding to the energy saving rate when the energy saving rate is input through the user interface unit,
determine the energy saving rate corresponding to the temperature recovery time when the temperature recovery time is input through the user interface unit, and
display the determined temperature recovery time or the determined energy saving rate through the user interface unit.

23. The apparatus of claim 12, wherein the setback control is determined to start if the non-occupancy period is greater than the minimum time interval.

24. The apparatus of claim 23, wherein the minimum time interval satisfies that energy required to maintain the target temperature while the apparatus for controlling temperature is on is equal to energy required to reach to the target temperature while the apparatus for controlling temperature is turned off and on again.

* * * * *